Figure 1:
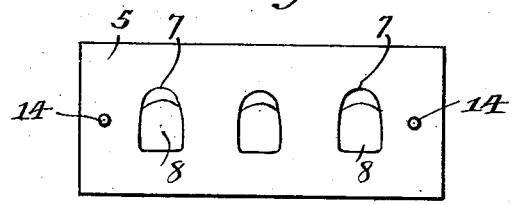

No. 868,109. PATENTED OCT. 15, 1907.
J. MORRIS.
METHOD OR PROCESS OF MAKING ARTIFICIAL TEETH.
APPLICATION FILED SEPT. 15, 1905.

Witnesses,
F. B. Mann
S. N. Pond

Inventor,
Joseph Morris
By Offield, Towle & Linthicum
Attys.

UNITED STATES PATENT OFFICE.

JOSEPH MORRIS, OF NORTH WALES, PENNSYLVANIA, ASSIGNOR TO THE DENTAL PROTECTIVE SUPPLY COMPANY OF THE UNITED STATES, OF CHICAGO, ILLINOIS, A CORPORATION OF ILLINOIS.

METHOD OR PROCESS OF MAKING ARTIFICIAL TEETH.

No. 868,109.  Specification of Letters Patent.  Patented Oct. 15, 1907.

Application filed September 15, 1905. Serial No. 278,610.

*To all whom it may concern:*

Be it known that I, JOSEPH MORRIS, a citizen of the United States, residing at North Wales, in the county of Montgomery and State of Pennsylvania, have invented certain new and useful Improvements in Methods or Processes of Making Artificial Teeth, of which the following is a specification.

This invention pertains to the manufacture of artificial teeth of that class or type which are commonly made of porcelain and are provided with inset pins on the back or reverse side for purposes of mechanical connection with a plate or bridge, the invention being applicable to the manufacture of both what are known as vulcanite teeth and what are known as plate or flat-back teeth. Porcelain teeth are commonly manufactured at present by a molding and subsequent burning process, the plastic porcelain forming the front and back halves of the artificial teeth being deposited in a pair of mold-plates, which latter are rigidly united with the mold-cavities in registration, the material being then dried out by a baking heat, which unites the front and rear parts, next removed from the mold and the edges thereof trimmed and shaped, and finally subjected to a fusing heat which thoroughly integrates and hardens the entire mass. In these operations, the porcelain forming the rear half of the tooth is, in its plastic state, cast around one or more pins, that serve later to mechanically connect the tooth to the plate, bridge, or other carrying member. The weak point in such teeth resides in the character of the anchorage of these pins therein. Platinum pins afford fairly good results, but are very expensive; and hence cheaper composition metal pins are being largely substituted. It has been found in practice that when these latter are employed, while they will withstand the fusing heat to which the tooth is finally subjected, yet the heat, through chemical action or from some other cause, produces fine bubbles in the material previously cast around the pins, producing tiny cavities, and weakening the anchorage of the pins in the porcelain. Again, in the ordinary vulcanite tooth, these pins, when made of "black metal", a carbonized nickel at present employed, show through the face of the tooth in the form of darkened spots.

The present invention has for its object to provide a new and improved method or process of manufacturing artificial teeth which obviates the objections above referred to and produces a tooth, whether of the vulcanite or flat-back variety, in which the pins have a stronger and more secure anchorage, and in which the discoloration resultant from the use of black metal pins is avoided.

To these ends, and in accordance with my invention, I have modified and improved the usual method of manufacture as hereinabove briefly outlined, chiefly in respect to the manner of anchoring the pins in the back of the tooth.

In accordance with my present invention, and in contradistinction to the method of casting and molding the body porcelain around the pins, I first cast and mold around the pins a novel composition material consisting preferably of porcelain mixed with an oxid or salt of one or more metals, which composition material affords a secure anchor for the pins, and then overlay this composition material in the mold with the body porcelain, which is later, in the final burning operation, integrated with the porcelain forming the front or face of the tooth.

Figure 2:
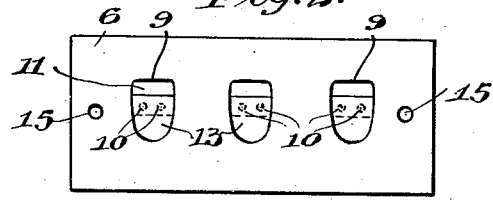
Figure 3:
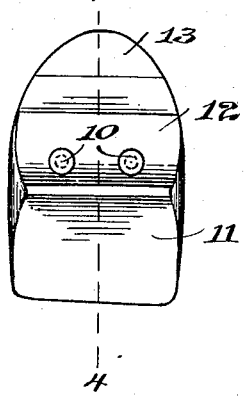
Figure 4:
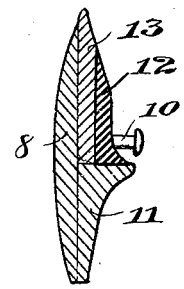

In order that my invention may be more readily understood, I have illustrated in the accompanying drawing a mold for carrying out the process, as well as a tooth forming the product of the process; and referring thereto,—Figure 1 is a plan view of the top section of a mold for making a tooth; Fig. 2 is a similar view of the bottom section of a mold in which the rear half of the tooth is cast and anchored to the pins; Fig. 3 is a rear elevational view of a finished tooth made in accordance with the method of the present invention; and Fig. 4 is a longitudinal vertical section on the line 4—4 of Fig. 3.

Referring now more in detail to the novel manner and process of manufacture of artificial teeth in which the present invention inheres, 5 and 6 may designate, respectively, the top and bottom plates or halves of a mold in which the tooth is formed. The mold-plate 5 contains a series of depressions or cavities 7, each of which corresponds in surface contour to the form of the outer or face section of a tooth. In each of these cavities is deposited in a plastic condition a body of powdered porcelain 8, adhered by water and gum tragacanth, which subsequently becomes the enamel front of the tooth. This material fills the cavity, except at the upper portion thereof, which latter is designed to subsequently have pressed thereinto part of the body porcelain from the opposite half of the mold, to form what is known as the neck of the tooth.

The lower mold-section 6 has a similar series of cavities 9, each having a pair of holes in its bottom for the reception of pins 10 that are to be embedded in the material cast therein. These cavities are loaded by pressing into the end corresponding to the lower or cutting end of the tooth a mass of plastic porcelain, designated by 11, which extends something less than one-half the total length of the cavity. Around the pins 10 is then packed a body of my novel composition consisting preferably of porcelain and metal oxid or salt in a plastic condition, this composition being indicated at 12 (Fig. 4), and entirely surrounding and embedding the exposed portions of the pins and extending upwardly toward that portion of the cavity in which the upper end or neck of the tooth is formed. Finally, a plastic charge of what is known as body porcelain is impressed into the remaining unfilled space of the cavity, completely overlying and covering the composition material 12, this body porcelain being indicated at 13 and being sufficient in quantity to fill the slight unfilled space in the cavity of the opposite mold-member when said parts are united and pressed together. The two halves of the mold, thus loaded, are laid together, face to face, and registered by pins 14 in one plate, passing through holes 15 in the other, and are then clamped together in a suitable brace. The whole is next subjected to a baking heat sufficient to thoroughly dry out the material and cause the several parts of the tooth to adhere to each other. Thereupon the mold is opened, and the teeth, having about the hardness and consistency of chalk, are removed, and their edges trimmed down to remove burs and fins. The teeth then undergo the final operation, which consists in subjecting them to a high burning heat, which causes the several porcelain portions and the reinforcing composition portion to become thoroughly fused and integrated. I find that the pins 10, when thus set in a composition material, such as specified, are very firmly anchored therein, while the composition material itself not only possesses a degree of resistance to breaking strains greater than the porcelain itself, but adheres to the latter with even greater strength than that of the porcelain itself. I have found by thorough tests that a tooth made as above described possesses fully double the strength and resistance to strains tending to break it away from the fastening pins of the usual solid porcelain teeth.

The reinforcing or anchoring material above mentioned comprises preferably porcelain mixed with about an equal part of an oxid or salt of one or more metals. The best results which I have thus far attained have been produced by a composition of substantially equal parts of porcelain and aluminium oxid; but good results are obtainable with the oxids of tin, nickle, corundum, zinc, barium and other metals, which may be used as substitutes for aluminium oxid, or with the latter, or with each other.

A preliminary step of the above described process of manufacture resides in the preparation of the composition material which is introduced to form the anchorage of the pins. In order to give the metal oxid or salt, which forms one of the components of said composition, a quality enabling it to fuse readily with the powdered porcelain forming the other ingredient, I preliminarily heat said oxid or salt to a very high temperature befoe mixing the same with the porcelain.

I do not herein claim the product of the above described process, as the same forms the subject-matter of a companion application filed concurrently herewith, Serial No. 278,611.

I claim:

1. The method of manufacturing artificial teeth which consists in molding with the porcelain body of a tooth a backing of composition material containing a metal oxid constituting an anchorage for the usual fastening pins, and then integrating said parts by heat, substantially as described.

2. The method of manufacturing artificial teeth which consists in subjecting a metal oxid to a high temperature, subsequently mixing said oxid with powdered porcelain, and then fusing said mixture with the body of a porcelain tooth and around the usual anchoring pins thereof, substantially as described.

3. The method of manufacturing artificial teeth which consists in charging the cavity of a mold-member with a plastic porcelain, erecting in the cavity of a companion mold-member one or more fastening pins, partially charging said last-named cavity around said fastening pins with an anchoring material of superior strength to the porcelain and fusible with the latter, filling the rest of said cavity with plastic porcelain, uniting the mold-members with said cavities in registration, and fusing said parts of the tooth together, substantially as described.

4. The method of manufacturing artificial teeth which consists in charging the cavity of a mold-member with plastic porcelain, erecting in the cavity of a companion mold-member one or more fastening pins, charging one end of said last-named cavity with plastic porcelain to form in part the backing of the tooth, further partially charging said last-named cavity around said fastening pins with an anchoring material of mixed porcelain and metal oxid, charging the rest of said cavity with body porcelain, uniting the mold-members with said cavities in registration, subjecting the mold to a baking heat, then removing and trimming the tooth, and finally subjecting it to a heat sufficient to fuse and integrate the parts, substantially as described.

5. The method of manufacturing artificial teeth which consists in subjecting a metal oxid to a high temperature, mixing said oxid with powdered porcelain in a plastic state to form an anchoring composition, charging the cavity of a mold-member with plastic porcelain, erecting in the cavity of a companion mold-member one or more fastening pins, charging one end of said last-named cavity with plastic porcelain to form the backing of the lower end of the tooth, further partially charging said last-named cavity around said fastening pins with said composition anchoring material, charging the rest of said cavity with body porcelain, uniting the mold-members with said cavities in registration, subjecting the mold to a baking heat, then removing and trimming the tooth, and finally subjecting it to a heat sufficient to fuse and integrate said parts, substantially as described.

JOSEPH MORRIS.

Witnesses:
THOMAS O. PEIRCE,
CLARENCE KENDERDINE.